Nov. 10, 1953 — J H. HUNT — 2,658,473
NONSQUEALING SHEET METAL BRAKE SHOE

Filed Sept. 27, 1949 — 3 Sheets-Sheet 1

INVENTOR.
J HAROLD HUNT
BY
Barnes, Kisselle, Laughlin & Raisch
Attorneys

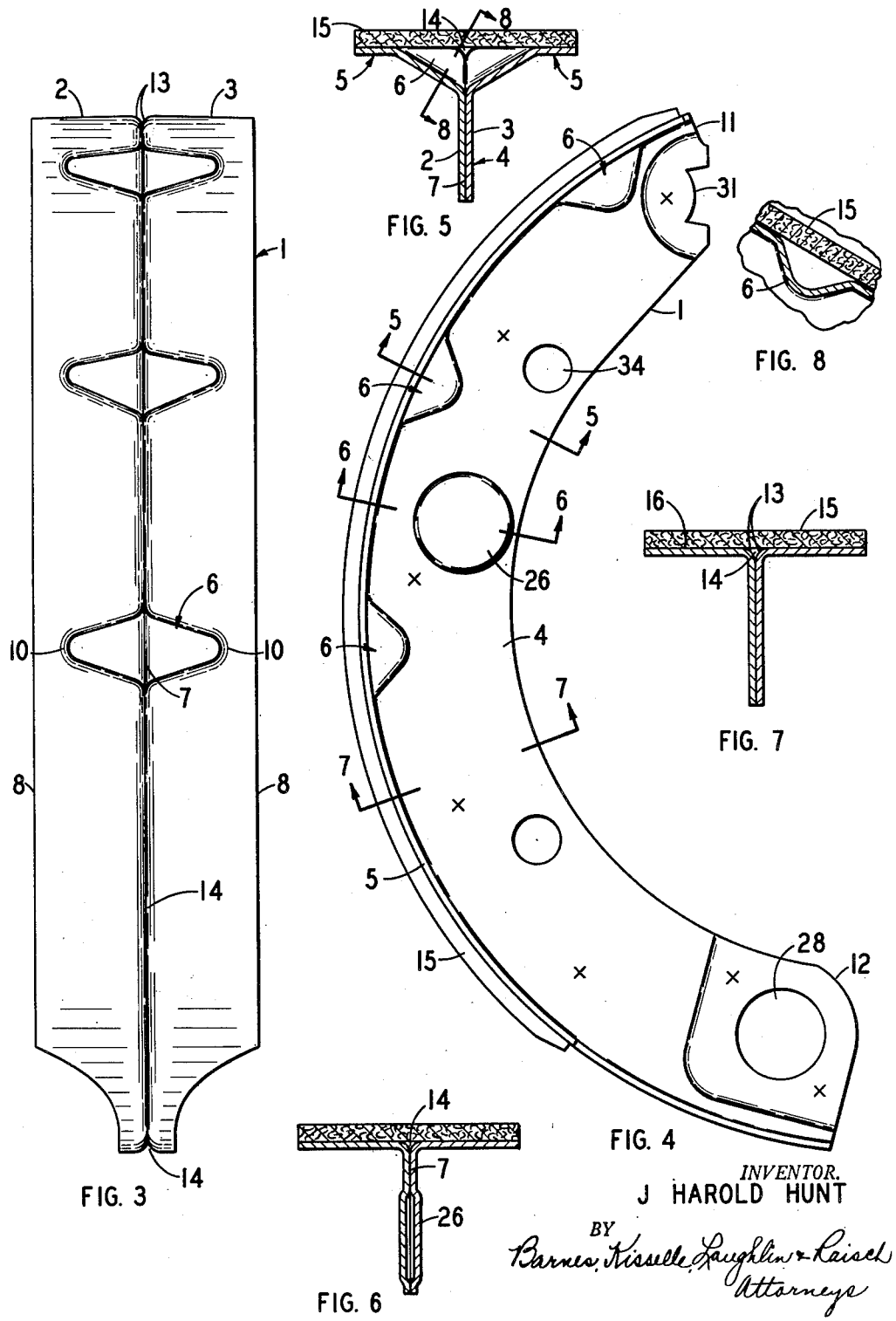

Nov. 10, 1953  J H. HUNT  2,658,473
NONSQUEALING SHEET METAL BRAKE SHOE
Filed Sept. 27, 1949  3 Sheets-Sheet 3

INVENTOR.
J HAROLD HUNT
BY
Barnes, Kisselle, Laughlin & Raisch
Attorneys

Patented Nov. 10, 1953

2,658,473

UNITED STATES PATENT OFFICE 2,658,473

NONSQUEALING SHEET METAL BRAKE SHOE

J Harold Hunt, Lansing, Mich., assignor to Motor Wheel Corporation, Lansing, Mich., a corporation of Michigan Application September 27, 1949, Serial No. 117,963

7 Claims. (Cl. 188—250)

This invention relates to a brake shoe and more particularly to a stamped brake shoe for use with a cylindrical brake drum on vehicles.

Although the instant brake shoe is designed particularly for use with a cylindrical brake drum on automotive vehicles, it can also be used with machinery or wherever the use of such type brake is indicated.

The invention contemplates a brake shoe made from two metal stampings which will resist all lateral stresses incident to its use, which is flexible to a limited degree from its normal circular configuration, and which is free from localized pressure areas when used in connection with a cylindrical brake drum.

It is an object of this invention to produce a brake shoe which, with lower brake pedal pressure, will produce equal or greater braking effect than brake shoes now in use, and which will increase the life of the lining used in connection with the shoe.

Another object of the present invention is to produce a brake shoe which will operate quietly and smoothly during the braking operation and thereby eliminate noise, vibration and roughness which is common in many currently used brakes.

It is common in present day practice to bond the brake lining on or to the brake shoe, but this type of brake shoe very often creates noises or squeals during braking.

This invention also contemplates a brake shoe which when used with a bonded lining, or lining otherwise applied, will brake quietly and without squeals.

The invention also contemplates a brake shoe which is of lighter weight and more economical to produce than the brake shoes of the prior art.

Fig. 3 is a face view of the brake shoe shown in Fig. 1 without the lining.

Fig. 4 is a side view or elevation of the shoe shown in Fig. 3 but with the brake lining bonded thereto.

Fig. 5 is a section along the line 5—5 of Fig. 4.

Fig. 6 is a section along the line 6—6 of Fig. 4.

Fig. 7 is a section along the line 7—7 of Fig. 4.

Fig. 8 is a section along the line 8—8 of Fig. 5.

Figure 1:
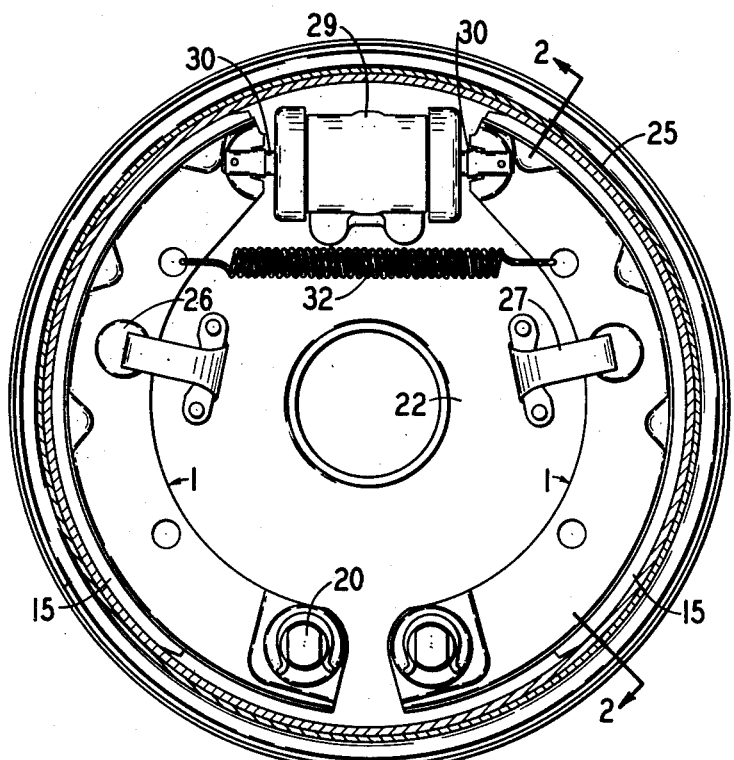
Fig. 1 is an elevation of a brake assembly including the brake shoe which is the subject of the present application.

Referring more particularly to the drawings, the instant brake shoe, generally designated 1, comprises two arcuate stampings 2 and 3 of L cross section which are placed back to back and fastened together. Each of the stampings 2, 3 is a mirror duplicate of the other and when assembled together produce a shoe having an arcuate radial web 4 and an arcuate lateral flange 5. The stampings can be joined together along their radial web portion in any suitable manner, such as by welding or riveting, but preferably are secured together by spot welding. The brake shoe can be made from any suitable metal or alloy such, for example, as low carbon steel. One of the advantages of the present brake shoe is that it can be made of light weight stock, for example, by way of description and not by way of limitation, brake shoes for passenger automobiles, such as 10 and 11 inch diameter brake shoes, can be made from sheet steel stock having a thickness of $\frac{1}{16}$ of an inch.

The brake shoe is strengthened laterally and rendered more flexible from a circular shape by a plurality of similar bridges or braces 6 formed in the shoe. Each bridge, when viewed from the outside of the shoe, Fig. 3, takes the form of an indentation, the metal being deformed both in the web 4 and the lateral flange 5 of the shoe. Each indentation 6 reaches its greatest width and depth at the junction 7 of stampings 2 and 3. Each half of each indentation 6 extends laterally slightly more than one-half of the distance between junction 7 and the side edges 8 of the lateral flange. Each half of the indentation 6 tapers, decreasing both in depth and breadth from joint 7 towards its respective lateral edge 8 until the depression merges into the outer surface of lateral flange 5 substantially in the area designated 10.

Many practical and successful embodiments of the instant brake shoe have been made and successfully operated. For purposes of description and not by way of limitation, one of the many successful embodiments of the present invention is as follows: A stamped metal brake shoe having a 10 inch diameter and stamped from steel stock having a thickness of $\frac{1}{16}$ of an inch and provided with three bridges 6 each having at the joint 7 a depth of substantially $\frac{3}{8}$ of an inch, a width of substantially $\frac{5}{8}$ of an inch, a length between points 10 of 1¼ inches, and spaced with one bridge being positioned approximately 90° from the anchor end 12 of the shoe, radial web 4 having a radial width of 1¼ inches, lateral flange 5 having a width of 2 inches, corners 13 being coved or curved about an arc having a radius of 1/16 of an inch so that groove 14 has a width of substantially ⅛ of an inch and a depth of substantially 1/16 of an inch.

The corners 13 of each stamping 2 and 3 are curved, preferably about a true radius, throughout the length of the corner to produce a generally V shaped groove 14 at the radial outer side of joint 7.

The brake lining 15, which is made of any of the well-known brake lining materials commonly used in automotive vehicle brakes, is preferably bonded but may be riveted or otherwise fixed to the outer face 16 of lateral flange 5. Face 16 is preferably a flat cylindrical surface. It will be noted that brake lining 15 bridges or covers groove 14 and indentations 6 but does not enter either groove 14 or indentations 6. Thus, lining 15 cooperates with groove 14 to form an arcuate chamber extending the length of the brake shoe and the lining cooperates with indentations 6 to form pockets or chambers which communicate with groove 14. Hence, pockets 6 can be considered as spaced enlargements of groove 14.

Figure 2:
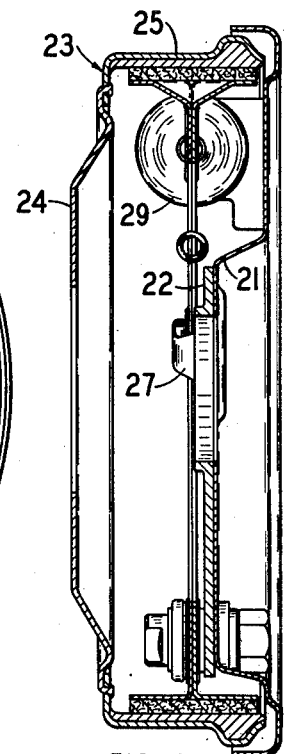
Fig. 2 is a section along the line 2—2 of Fig. 1.

The brake assembly is shown in Fig. 1. Each brake shoe 1 is pivotally anchored on a bolt 20. Each bolt 20 is carried by a backing plate 21, Fig. 2, and a reinforcing plate 22. Plates 21 and 22 are fixed to the axle housing. The brake drum 23 comprises a back 24 which carries the braking flange 25. Web 4 of each shoe has an embossed spot 26 which form bearing surfaces for the resilient restraining members or fingers 27 which are riveted to plate 21. The bearing opening in web 4 for anchor bolt 20 is designated 28.

The brakes are applied by introducing hydraulic pressure into cylinder 29 mounted on plate 21 which acts upon pistons (not shown) and piston rods 30 to force the ends 11 of the brake shoes apart. Ends 11 of the brake shoes are provided with bearing seats 31 for the ends of piston rods 30. Shoes 1 are urged toward each other or to brake releasing position by tension coil spring 32 anchored at its opposite ends in openings 34 in webs 4 of the brake shoes.

Figure 9:
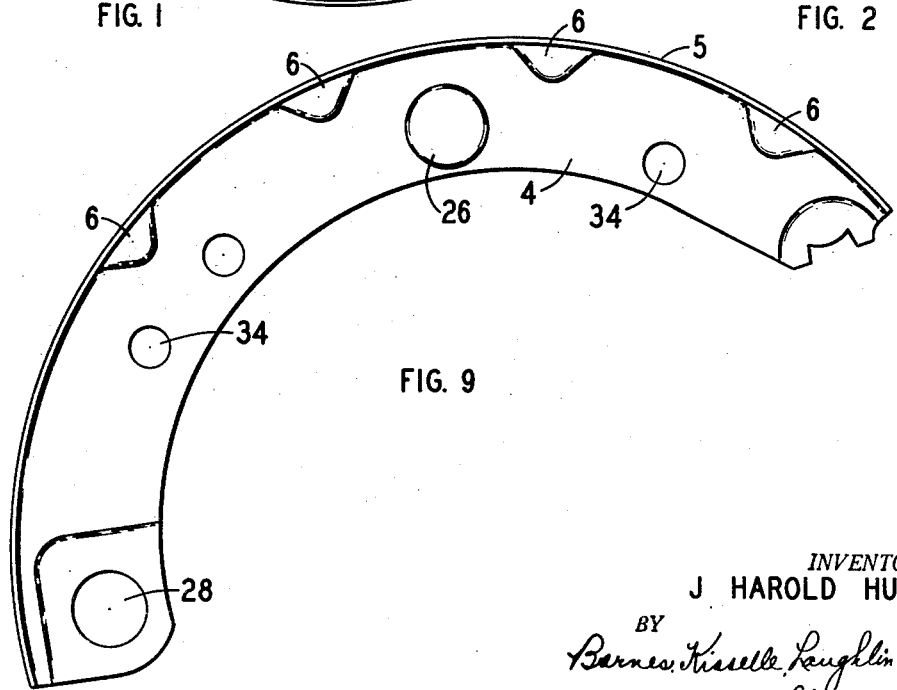
Fig. 9 is a side elevation of a modified form of the brake shoe which is the subject of this invention.
Figures 10, 11:
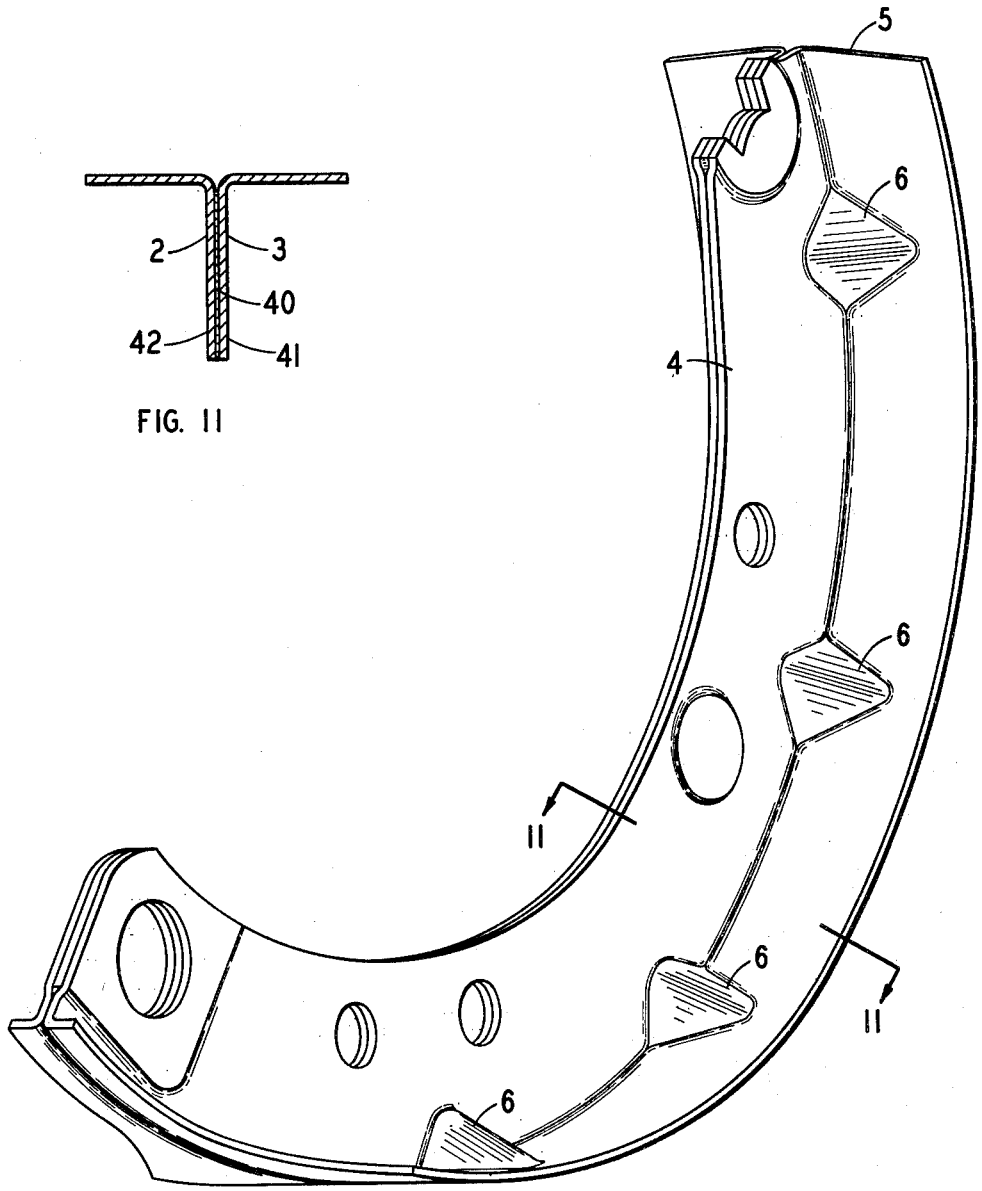
Fig. 10 is an isometric view of the brake shoe shown in Fig. 9.
Fig. 11 is a cross section of a modified form of brake shoe with a non-metallic sound dampening filler between the shoe stampings, and taken along line 11—11 of Fig. 10.

The brake shoe shown in Figs. 9 and 10 is similar with that shown in Figs. 1 to 8 except that it has four bridges or braces 6 instead of three.

The instant brake shoe is made from thinner metal stock than that commonly used in automotive brake shoes and derives its strength laterally through the bridges 6. As the brake is applied it is necessary in order to develop good braking performance that the shoe conform to the brake drum. The bridges 6 in the instant shoe enable it to flex circumferentially or radially and follow or conform to the contour of drum 1 which, particularly during the braking action, may not be a perfect circle.

The instant shoe also eliminates the high unit stresses that commonly occur directly over the radial web of the shoe in other types of brake shoes now being used. Groove 14 plays an important role in eliminating such high unit stresses because in the instant brake shoe there is no support for the lining 15 directly over radial web 4 and this eliminates the high unit pressure directly over web 4. The lateral edges of flange 5 are subjected to bending stresses during the application of the brake but bridges 6 strengthen flange 5 and thereby prevent lateral bending of the flange 5 and cause a uniform pressure to be applied to the brake lining. The number of bridges 6 and their location circumferentially of the shoe will be determined by the size of the shoe and by the load that the shoe will be required to carry.

It is believed that bridges 6, besides making the shoe radially or circumferentially flexible and strengthening flange 5, play an important role in the quiet operation of the instant brake shoe. Groove 14 also cooperates with bridges 6 to make the brake shoe silent in operation.

In the modified form of brake shoe shown in Fig. 11, the stampings 2 and 3 are the same as those in the principal form of the invention. An arcuate strip of sound dampening material 40 is positioned between the arcuate webs 41 and 42 of the stampings and the stampings 2 and 3 are secured together in any suitable manner such as by riveting or projection welding. The sound dampening filler 40 extends throughout the length of the webs 41 and 42 so that there is little or no metallic contact between shoe members 2 and 3. Filler 40 can be made of any suitable non-metallic vibration dampening or deadening material such as the materials conventionally used for non-metallic gaskets or for automotive vehicle brake linings, many of which contain substantial proportions of asbestos fibers bonded together with a high melting point binder. Filler 40 can also be made of a dead metal (vibration dampening metal) such as lead, bronze or copper. The filler material 40 should have a charring temperature above the highest operating temperature of the shoe members 2 and 3 due to the heat generated in braking. Preferably the material 40 should be slightly elastic or compressible.

I claim:

1. A stamped metal brake shoe comprising a substantially arcuate lateral flange and an arcuate web, and a plurality of reinforcing bridges in the form of indentations in said flange and web extending radially inwardly from the outer face of said flange into said web and laterally in said flange on both sides of said web, each indentation having its greatest depth substantially in the plane of the web and decreasing in depth toward the lateral edges of the said flange, each indentation also having its greatest width substantially in the plane of the said flange and decreasing in width from the median line of said flange toward the lateral edges of said flange, each of said indentations extending laterally at least one-half the distance between the side edges of said lateral flange, said indentations being spaced circumferentially along the brake shoe and the brake shoe being provided with an external groove at the junction of the flange and web, said groove being narrower and shallower than said indentations and extending from substantially the mid-section of one indentation to that of the other.

2. A brake shoe comprising two L section substantially arcuate metal stampings secured back to back to form a double thickness web and oppositely extending cylindrical flanges, and a plurality of reinforcing bridges in the form of tapered indentations in said flanges and web extending radially inwardly at the junction of said L section stampings from the outer face of said flanges into said web and tapering laterally in said flanges on both sides of said web, each indentation having its greatest depth substantially in the plane of the web and decreasing in depth toward the lateral edges of the said flange, each indentation also having its greatest width substantially in the plane of the said flanges and decreasing in width from the junction of said stampings toward the lateral edges of said flanges, the lateral extent of each indentation being greater than the circumferential extent thereof and each indentation extending laterally at least one-half the distance between the side edges of the lateral flange.

3. The brake shoe claimed in claim 1 including a lining secured to the outer face of said flange and bridging said indentations and groove to form a cover therefor.

4. The brake shoe claimed in claim 3 wherein each indentation is substantially symmetrical with respect to said web and the lateral extent of each indentation is greater than the circumferential extent thereof.

5. The brake shoe claimed in claim 2 wherein the indentations are spaced circumferentially along the brake shoe and the brake shoe is provided with an external groove at the junction of the flange and web, said groove being narrower and shallower than said indentations and extending from substantially the mid-section of one indentation to that of the other.

6. The brake shoe claimed in claim 5 including a lining secured to the outer face of said flange and bridging said indentations and groove to form a cover therefor.

7. The brake shoe claimed in claim 6 wherein each stamping is substantially a mirror image of the other.

J HAROLD HUNT.

References Cited in the file of this patent

UNITED STATES PATENTS

| Number | Name | Date |
|---|---|---|
| 1,671,728 | LaBrie | May 29, 1928 |
| 1,811,916 | Carter | June 30, 1931 |
| 1,818,090 | Peterson | Aug. 11, 1931 |
| 1,848,084 | Bendix | Mar. 1, 1932 |
| 1,896,013 | Reasoner | Jan. 31, 1933 |
| 1,898,310 | Peterson | Feb. 21, 1933 |
| 1,923,872 | Loughead | Aug. 22, 1933 |
| 1,925,363 | Apple | Sept. 5, 1933 |
| 1,954,524 | Goepfrich | Apr. 10, 1934 |
| 1,966,750 | Boughton | July 17, 1934 |
| 2,048,433 | Delahaye | July 21, 1936 |
| 2,121,269 | Sisson | June 21, 1938 |
| 2,231,208 | Crede | Feb. 11, 1941 |
| 2,414,687 | Birchfield | Jan. 21, 1947 |
| 2,541,253 | House | Feb. 13, 1951 |

FOREIGN PATENTS

| Number | Country | Date |
|---|---|---|
| 918,266 | France | Feb. 4, 1947 |